Jan. 18, 1938.  E. E. MÅRTENSSON  2,105,542
TESTING APPARATUS
Filed Jan. 10, 1935
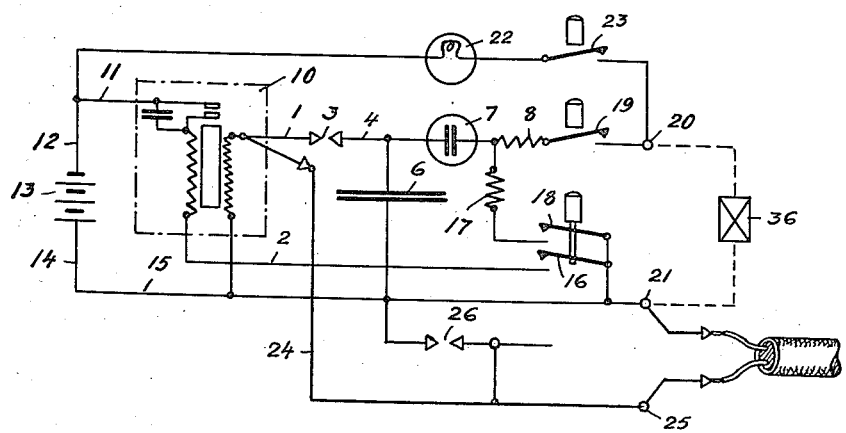
Inventor:
ERIK EINAR MÅRTENSSON
by:
ATTORNEY.

Patented Jan. 18, 1938

2,105,542

UNITED STATES PATENT OFFICE 2,105,542

TESTING APPARATUS

Erik Einar Mårtensson, Stockholm, Sweden

Application January 10, 1935, Serial No. 1,088
In Sweden September 15, 1934

4 Claims. (Cl. 175—183)

The present invention relates to an arrangement for generating direct voltage of high tension which is particularly adapted for use as a source of voltage in portable electrical testing apparatus, for instance for testing the insulating resistance and for detecting insulating faults in condensers, cables or the like.

Arrangements are previously known by means of which direct voltage can be obtained by charging one or more condensers from an alternating current source through valves serving as rectifiers. Said known arrangements are, however, expensive and complicated and are on account of their considerable weight and of the great mechanical sensitivity of the rectifier arrangement not suitable for use as a source of voltage in portable testing apparatus.

According to the present invention a very light, simple, and robust arrangement for generating direct voltage has been obtained by substituting for the valves a spark gap or other similar discharge path and by selecting as the source of current an induction coil of small dimensions connected to a small battery, preferably a dry cell. In a preferred embodiment of the invention there is connected in parallel with the condenser to be charged a leakage circuit for controlling the voltage of said condenser, which leakage circuit includes a glow discharge lamp or other discharge path and, in some instances, also an ohmic resistance. When using the arrangement according to the invention as the source of current in portable electrical testing apparatus the glow discharge lamp included in the leakage circuit can preferably be used also as the current indicator during the tests, the glow discharge lamp being included in the leakage circuit during the period of charging the condenser and between the terminals of the condenser in series with the object to be tested during the testing period.

The invention will be more closely described with reference to the accompanying drawing which shows an arrangement according to the invention used as a source of test voltage in an electrical insulation testing apparatus.

Referring to the drawing, 10 indicates an induction coil the secondary winding of which is connected to two wires 1 and 15 and the primary winding of which is fed from a battery 13, the positive terminal 12 of the battery being connected to the make and break contact through wires 11, and the negative terminal 14 being adapted to be connected to the other end of the primary winding by means of a push button switch 16 over the wire 15 and a wire 2. To the wire 1 is connected one terminal of the spark gap 3 the other terminal of which is connected by a wire 4 to one terminal of the condenser 6 to be charged. The other terminal of the condenser 6 is connected to the wire 15. To the first mentioned terminal of the condenser 6 is also connected one terminal of the glow discharge lamp 7 the other terminal of which is adapted to be connected to the second terminal of the condenser 6 to be charged, either through a series resistance 17 and a switch 18 mechanically coupled with the switch 16, or through a series resistance 8, a switch 19 and the object to be tested 36 which is connected between the connecting terminals 20 and 21.

Between the positive terminal 12 of the battery 13 and the connecting terminal 20 is included an incandescent lamp 22 in series with a push button switch 23. The other connecting terminal 21 is permanently connected over the wire 15 to the negative terminal 14 of the battery 13.

There is indicated an extra arrangement for testing for instance the dielectric strength of cables. The wire 1 is by means of a wire 24 connected to a connecting terminal 25. Between the wires 15 and 24 is included an adjustable spark gap 26. The cores of the cable between which the dielectric strength is to be tested are connected to the connecting terminals 21 and 25 respectively.

The testing apparatus is used in the following manner:

It will be assumed that the insulation of a condenser 36 is to be tested. After the condenser 36 has been included between the connecting terminals 20 and 21, the push button 16, 18 is pressed. A feed circuit is then closed from the battery 13 to the induction coil 10 via the switch 16, and the glow discharge lamp 7 is included in series with the series resistance 17 in a circuit connected in parallel with the condenser 6. The induction coil 10 is started whereafter the charging of the condenser 6 to the desired test voltage takes place in the following manner:

When upon the pressing of the button 16, 18 the voltage of the induction coil approaches its greatest maximum value (for instance its positive maximum value) the voltage across the spark gap 3 will exceed the ignition voltage, an arcing- over then taking place causing the condenser to receive a certain charge. The voltage of the condenser then rises somewhat. When thereafter the voltage of the induction coil drops through zero to its negative maximum value the condenser will evidently get a tendency to discharge across the spark gap. The sum of the condenser voltage and the negative maximum voltage of the induction coil will, however, not reach a value amounting to the ignition voltage of the spark gap wherefore the charge received remains on the condenser. When the voltage of the induction coil approaches its positive maximum value the next time, an arcing-over will again occur in the spark gap, and the condenser receives a further charge so that its voltage is further increased. In this manner the condenser is charged in steps until its voltage has reached a value corresponding to the ignition voltage of the glow discharge lamp 7 connected in parallel therewith. When this occurs a flashover will take place in the glow discharge lamp 7 so that a leakage circuit including the glow discharge lamp 7 and its series resistance 17 is closed across the condenser 6. The leakage current through said circuit is to begin with very insignificant, because as long as the voltage across the condenser is low the glow discharge lamp will take up the greater part of the voltage drop. According as the voltage on the condenser is increased the series resistance will, however, take up a greater part of the total voltage drop wherefore the leakage current increases more rapidly than the voltage of the condenser 6 to be charged. On the other hand, the charge supplied to the condenser for each period of the pulsating alternating voltage becomes smaller and smaller the higher the condenser voltage gets. When the quantity of electricity charged into the condenser 6 per unit of time becomes equal to the quantity of electricity passing from the condenser through the leakage circuit in the same period of time a condition of equilibrium will evidently exist upon the reaching of which the voltage does not rise any longer in spite of the button 16, 18 being kept continuously pressed. By suitably dimensioning the series resistance 17, it is evidently possible to prevent the condenser voltage from reaching so high a value that the sum of said voltage and the negative maximum voltage of the induction coil amounts to the ignition voltage of the spark gap. The discharge of the condenser 6 across the spark gap 3 is hereby effectively prevented. On the other hand, the final voltage of the condenser 6 must be considerably higher than the ignition voltage of the glow discharge lamp 7 since in the shown apparatus the glow discharge lamp included in the leakage circuit during the charging period is to be used as an indicator during the testing period.

When the button 16, 18 has been pressed sufficiently long for the condenser 6 to have reached its final voltage, usually three to four seconds, which is indicated by the glow discharge lamp glowing steadily with a definite luminous intensity, said button is released and the button 19 pressed instead for 5 to 8 seconds, the glow discharge lamp being then connected, in series with the series resistance 8, between the condenser 6 and the condenser 36 to be tested. If the insulation is good a single short glow is obtained in the glow discharge lamp 7 on account of the tested condenser receiving a charging current which is interrupted when the voltage difference between the condensers 6 and 36 has fallen to the value of the quenching voltage of the glow discharge lamp 7. The relative duration of the glow is dependent also upon the dimensions of the series resistance 8. If the insulation is less good the voltage of the charged condenser 36 will gradually drop on account of leakage until the voltage difference between the condenser 6 and the condenser 36 under test has again risen to the value of the ignition voltage of the glow discharge lamp when a renewed charging through the glow discharge lamp takes place with consequent glow. The more frequently the glow phenomena return the poorer is evidently the insulation. If a strong and prolonged glow is obtained the tested condenser 36 has a very poor insulation. If upon pressing of the button 23 the incandescent lamp 22 will burn a short-circuit is at hand.

If in testing a faultless condenser one desires to observe, the charging glow repeatedly, the condenser 36 must be discharged between every time the button 19 is pressed. This can be effected by pressing the button 23, the condenser 36 then discharging through the incandescent lamp 22 and the battery 13.

The invention is of course not limited to the shown embodiment but can be modified in different ways. It is thus conceivable to include in the leakage circuit an individual glow discharge lamp or other discharge path the quenching voltage of which considerably exceeds the ignition voltage of the glow discharge lamp used during the testing period as an indicator. In this case a final voltage on the condenser 6 is obtained which is practically independent of fluctuations in the maximum voltage generated by the induction coil. Furthermore, it is not absolutely necessary to provide a leakage circuit in parallel with the condenser 6 but said circuit can also be left out. Finally there can, of course, be used in place of an induction coil every other arrangement for generating a pulsating alternating current having different positive and negative maximum values.

I claim:—

1. An arrangement for testing electrical insulation, comprising in combination a battery, an interrupter, an induction coil having a primary and secondary winding, said primary fed by said battery through said interrupter, a condenser, a spark gap having stationary electrodes, said condenser and said spark gap connected in series with said secondary, a voltage limiting leakage circuit including a glow discharge path connected in parallel with said condenser, a testing circuit including a current indicating means, means for including an object to be tested in said testing circuit, and means for connecting said testing circuit with said condenser when charged to the desired voltage.

2. An arrangement for testing electrical insulation, comprising in combination a battery, an interrupter, an induction coil having a primary and secondary winding, said primary fed by said battery through said interrupter, a condenser, a spark gap having stationary electrodes, said condenser and said spark gap connected in series with said secondary, a leakage circuit, a test circuit comprising means for connecting the object to be tested, a gas filled electrical discharge vessel, means for connecting said discharge vessel either with said leakage circuit or with said test circuit, thereby connecting either of said circuits in parallel with said condenser, said vessel acting as voltage limiting element when included in said circuit and acting as current indicating means when included in said test circuit.

3. An arrangement for testing electrical insulation, comprising in combination a battery, an interrupter, an induction coil having a primary and secondary winding, said primary connected in series with said interrupter and said battery, a condenser, a spark gap having stationary electrodes, said condenser and spark gap connected in series with said secondary, a normally open leakage circuit connected in parallel with said condenser, a normally open test circuit connected in parallel with said condenser, an electric glow discharge device, a switching means for including said discharge device in said leakage circuit, thereby closing said circuit and acting therein as a voltage limiting element, another switching means for including said discharge device in said test circuit, thereby closing said circuit and acting therein as a current indicating means, and means connected with said switching means for simultaneously opening one and closing the other switching means, and vice versa.

4. A portable apparatus for testing electrical insulation, comprising in combination a battery, an interrupter, an induction coil having a primary and secondary winding, said primary connected in series with said interrupter and said battery, a condenser, a spark gap having stationary electrodes and being capable of passing current in both directions, said condenser and said spark gap connected in series with said secondary, a voltage controlling circuit comprising an impedance, said circuit adapted to be connected in parallel with said condenser, a test circuit comprising means for connecting the object to be tested, a gas filled electric discharge device, switching means for connecting said discharge device with said leakage circuit, thereby connecting said leakage circuit with said condenser and said discharge device acting therein as a voltage controlling element, another switching means for connecting said discharge device with said test circuit, thereby connecting said test circuit with said condenser and said discharge device acting as a current indicating means, an incandescent lamp and another switching means for connecting said incandescent lamp in series with the battery and the object to be tested, lamp to indicate an electrical short circuit, if present.

ERIK EINAR MÅRTENSSON.